March 16, 1943.   A. L. RICHE   2,313,969
CONTROL APPARATUS
Filed Aug. 3, 1940
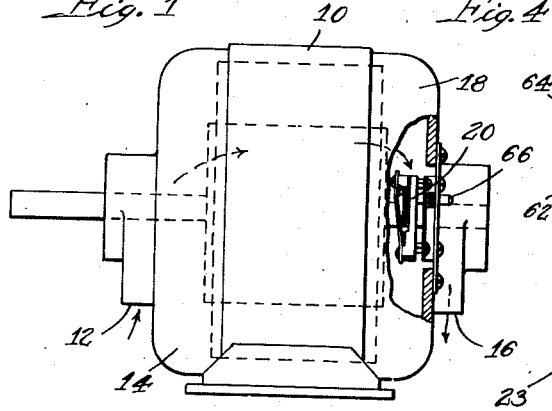
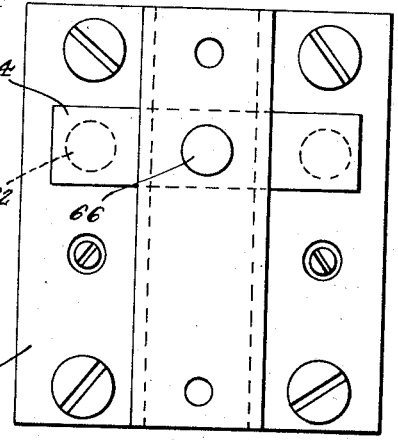
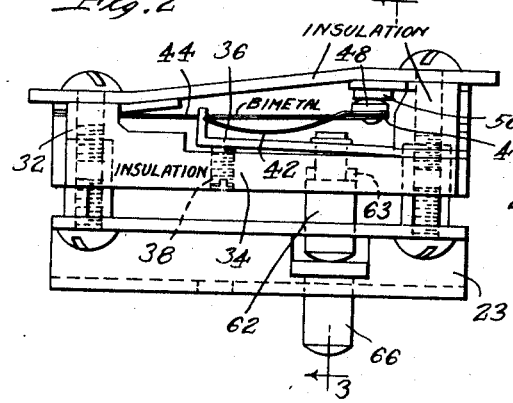
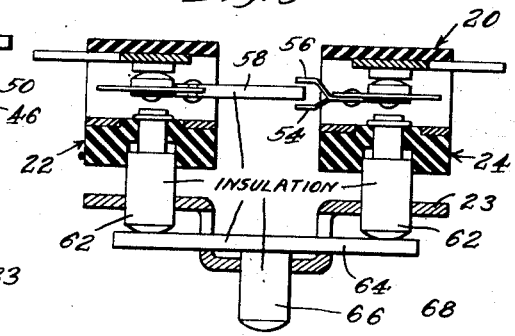
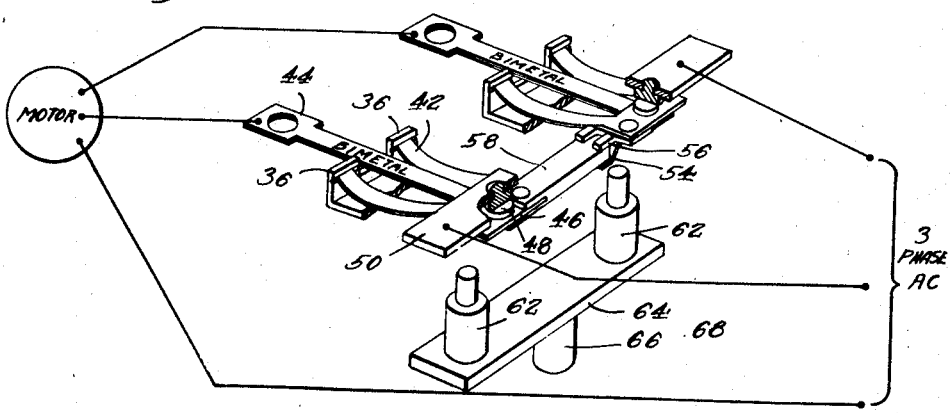
Inventor:
ARTHUR L. RICHE
By Karl H. Sommermeyer
Atty.

Patented Mar. 16, 1943

2,313,969

UNITED STATES PATENT OFFICE 2,313,969

CONTROL APPARATUS

Arthur L. Riche, Freeport, Ill., assignor to Micro Switch Corporation, Freeport, Ill., a corporation of Illinois Application August 3, 1940, Serial No. 350,305

4 Claims. (Cl. 200—113)

The present invention relates to thermostats and the like, and more particularly to thermal protectors for electric motors and the like.

Thermal protectors are known wherein a snap acting thermostatic switch responds to the heating effect of the current drawn by the motor, on the thermal element of the switch, to open the energizing circuit when the heating effect becomes dangerous to the motor. In polyphase apparatus, it is desirable that each of two or more conductors of the circuit be separately protected in this manner, but it is desirable also that the response to current of each separate conductor should be effective for opening two or more conductors for the purpose of deenergizing the motor or other power translating device.

Objects of the invention include the provisions of an improved thermal protector for polyphase motors and the like, and the provision of an improved thermostatic control device.

Further objects include the provision of an improved and simplified polyphase motor protector.

These and other objects and advantages of the present invention will become apparent from the following description of one specific embodiment thereof which serves by way of example to illustrate the manner in which the invention may be put into practice. In the drawing:

Fig. 1 is a side elevation, partly broken away, of an electric motor with the control apparatus of this invention mounted therein;

Figs. 2, 3, and 4 are different views of the polyphase control apparatus itself; and Fig. 5 is a partially diagrammatic representation of certain features of the invention.

In Fig. 1, an electric motor 10 has an air inlet opening 12 in the end bell 14 to the left end of the motor as seen in the drawing, and an exit air opening 16 in the opposite end bell 18. A thermal protective device 20 is mounted in the end bell 18 so as to be exposed to the exit air, that is the ventilating air after it has been heated by its passage through the motor structure and across the surface of the various windings. The protector 20 is shown in more detail in the different views of Figs. 2, 3, and 4.

The polyphase control device 20 includes two thermostatic electric switches 22 and 24 of the general construction illustrated in the copending application of M. W. Eaton, Serial No. 277,436, filed June 5, 1939, now Patent No. 2,272,459, issued February 10, 1942. They are mounted together on a formed metal bracket 23.

Each of the two separate thermal switches 22 and 24 includes an insulating base 32 (Fig. 2) which includes an elongated bed portion 34. This bed portion carries an elongated brass anchor member 36 which is adjustable up and down by means of an adjusting screw 38, which extends through the bed portion 34 of the insulating base 32. The snap acting element consists of a three pronged spring (seen best in Fig. 5) which comprises a pair of resilient side members or bowed, thin leaf compression springs 42, and a central bimetal tension member 44. The two bowed compression springs are supported on upturned ends of the anchor 36. The bimetal strip 44 is mounted directly on a raised portion of the insulating base 32 itself. The end 46 at which the three springs 42, 42, and 44 are connected carries an electric contact 48. The bimetal strip 44 has its high expansion material on its upper surface and so tends to move its free end down upon a rise in temperature.

This three pronged spring 40 constitutes an over center toggle having a snap action. At normal temperatures, that is temperatures at which an electric motor can safely operate, the spring can remain in its uppermost position holding its contact 48 in engagement with a stationary contact 50 to maintain the controlled circuit closed. When the bimetal strip reaches a predetermined temperature, it overcomes the opposing force of the compression springs 42 and opens the contacts with a snap action.

The movable end of the three-pronged, snap-acting, spring element of each of the two switches 22 and 24 is connected to the similar three-pronged, snap-acting, spring element of the other switch through a lost motion connection that enables each snap element to drive the other. This lost motion connection consists of a pair of tongues 54 and 56 (see Fig. 3) carried by the movable end of the snap element of thermal switch 24, and a third tongue 58 lying between the two tongues 54 and 56 and carried by the movable end of the snap element of switch 22. As may be seen from Figs. 3 and 5, when the two thermal switches 22 and 24 are in their circuit closed positions, the tongues 54 and 56 are both spaced away from the tongue 58. Consequently, when either snap element begins its snap operation, it does so entirely by itself, unassisted and unimpeded by the other snap element. However, the full motion of each snap element is sufficiently great that after the snap motion is under way, the tongues come into engagement and one snap element drives the other to open it. Both toggles go over center and so remain in their circuit open positions.

The protective device is connected in the power circuit for a three phase motor as indicated in Fig. 5. Each snap acting switch protects one power conductor; that is, as it is generally called, one phase, and by itself responds to that phase, and protects it against overload. As a result of the mechanical interconnection between the two separate thermal switches, the operation of either effects the opening of both so as to interrupt two phases and so deenergize the motor.

Each of the thermal switches 22 and 24 includes also a movable stop 62 for the movable end of its snap element. When the switch snaps open, the movable end 46 stops against the top surface of this movable stop. A manual reset actuator 68 consists of a bar 64 actuated by a push button 66 for raising both of the stops 62 together for reclosing the two thermal switches simultaneously.

Each stop 62 has its upward motion limited by the bottom of a counter-bore 63 in which the large portion of the stop 62 slides. This counter-bore 63 limits the upward motion of stop 62 so that when in its uppermost position stop 62 fails to touch the toggle spring, if that spring is in its uppermost position. Consequently, the stop 62 cannot hold the contacts 48 and 50 in engagement. When stop 62 is moved to its uppermost position for reclosing the circuit, the stop 62 itself merely carries the toggle spring and the contact 48 up to a position, short of the contact-closed position. Thereupon, if the bimetal element 44 is sufficiently cool, the toggle snaps itself up to the circuit closed position. Accordingly, if the bimetal 44 is hot, actuation of the manual reset 68 cannot reclose the circuit.

Obviously, my improved control device is not limited to use as a controller on protectors for polyphase electric motors, but is adapted to general use, in applications where it is desirable that two separate control devices operate together.

The specific construction and embodiment, herein shown and described, is offered only by way of example to illustrate the use and practice of the invention, and the invention itself embraces all modifications and variations that fall within the scope of the appended claims.

I claim:

1. In combination in a snap acting device, two snap acting elements, said device including a separate primary actuator for each of said snap acting elements, and a two-direction, lost-motion connection between said snap action elements, permitting each to drive the other therethrough, such that either of said elements, in executing a snap motion in response to actuation by its own primary actuator, moves a predetermined distance and then engages the other to drive it.

2. In combination in a thermal protector for a polyphase electric motor or the like, two normally closed electric snap switches, each of which is connected in a separate circuit conductor to the apparatus to be protected, a separate thermal actuator and snap element for each switch for actuating it with a snap action in response to a rise of temperature to open its own circuit, means for heating each said thermal actuator in response to the current traversing the conductor in which its switch is connected, a two-direction, lost-motion, mechanical connection between the snap elements of said snap acting switches, such that each switch in executing its snap motion in response to actuation by its own thermal element, first moves a predetermined distance and then engages the other to carry it along, whereby to open the circuits of both said switches in response to the thermal actuation of either one thereof, and means for reclosing said switches together.

3. In combination in a snap acting device, two snap acting elements, said device including a separate thermal actuator for each of said snap acting elements, and means providing a two direction, lost-motion connection between the snap acting elements, said means comprising two pairs of abutting surfaces for enabling each of said snap acting elements to drive the other element therethrough.

4. In combination in a thermal protector for a polyphase electric motor or the like, two thermally and electrically independent, thermally actuated, electric switches, each of said switches including a snap acting element, and a mechanical, lost-motion connection between said snap acting elements so constructed that the snap acting element of each switch is enabled to drive the snap acting element of the other switch through said connection.

ARTHUR L. RICHE.